US009144007B2

(12) United States Patent
Ramanujan et al.

(10) Patent No.: US 9,144,007 B2
(45) Date of Patent: Sep. 22, 2015

(54) WIRELESS INFRASTRUCTURE ACCESS NETWORK AND METHOD FOR COMMUNICATION ON SUCH NETWORK

(75) Inventors: Ranga S. Ramanujan, Medina, MN (US); Maher N. Kaddoura, Maple Grove, MN (US); Kenneth J. Thurber, Hopkins, MN (US)

(73) Assignee: Architecture Technology, Inc., Eden Prairie, MN (US)

( * ) Notice: Subject to any disclaimer, the term of this patent is extended or adjusted under 35 U.S.C. 154(b) by 1273 days.

(21) Appl. No.: 12/580,952

(22) Filed: Oct. 16, 2009

(65) Prior Publication Data
US 2011/0090843 A1    Apr. 21, 2011

(51) Int. Cl.
*H04W 40/00* (2009.01)
*H04W 40/12* (2009.01)
*H04W 40/22* (2009.01)

(52) U.S. Cl.
CPC .............. *H04W 40/12* (2013.01); *H04W 40/22* (2013.01)

(58) Field of Classification Search
USPC ........................................................ 370/328
See application file for complete search history.

(56) References Cited

U.S. PATENT DOCUMENTS

| 6,717,956 | B1* | 4/2004 | Fan et al. ...................... 370/477 |
| 2003/0039206 | A1* | 2/2003 | Dang et al. .................... 370/215 |
| 2004/0122976 | A1* | 6/2004 | Dutta et al. ................... 709/245 |
| 2006/0002312 | A1* | 1/2006 | Delattre et al. ............... 370/254 |
| 2006/0019653 | A1* | 1/2006 | Stamoulis et al. ............ 455/425 |
| 2007/0217406 | A1* | 9/2007 | Riedel et al. .................. 370/389 |

OTHER PUBLICATIONS

Ramanujan et al., "Source-Initiated Adaptive Routing Algorithm (SARA) for Autonomous Wireless Local Area Networks", *Proceedings of the 23rd IEEE Conference on Computer Networks*, Boston, MA (Oct. 1998).
Ramanujan et al., "Simulation of Routing Protocols For Autonomous Wireless Local Area Networks", *Proceedings of MILCOM 98*, Boston, MA (Oct. 19-21, 1998).

* cited by examiner

*Primary Examiner* — Sulaiman Nooristany
(74) *Attorney, Agent, or Firm* — IPLM Group, P.A.

(57) ABSTRACT

Method of communication, in a wireless infrastructure access network having a plurality of wireless-enabled network nodes (WNNs), with a wireless-enabled infrastructure gateway node (WIG) and a wireless infrastructure access network. A default unidirectional route is established from each of said plurality of wireless-enabled network nodes (WNNs) to said wireless-enabled infrastructure gateway node (WIG). A bi-directional packet pathway is established over said wireless infrastructure access network between any given one of said wireless-enabled network nodes (WNNs) and said wireless infrastructure gateway node (WIG) that satisfies a specified quality of service (QoS).

39 Claims, 11 Drawing Sheets

Status message 50

| Original WNN | One-hop neighbors | Available network resources | U.S.N. | Destination |
|---|---|---|---|---|
| 52 | 54 | 56 | 58 | 60 |

Fig. 2

Neighbor Table 70

| | Link_Status[0] | Can_Hear_Node[0] | Neighbor_Timestamp[0] | Neighbor_Status[0] | Cross_Threshold[0] |
|---|---|---|---|---|---|
| 0 | Link_Status[0] | Can_Hear_Node[0] | Neighbor_Timestamp[0] | Neighbor_Status[0] | Cross_Threshold[0] |
| 1 | Link_Status[1] | Can_Hear_Node[1] | Neighbor_Timestamp[1] | Neighbor_Status[1] | Cross_Threshold[1] |
| . | | | | | |
| n | Link_Status[n] | Can_Hear_Node[n] | Neighbor_Timestamp[n] | Neighbor_Status[n] | Cross_Threshold[n] |
| 82 | 72 | 74 | 76 | 78 | 80 |

Fig. 4

Route Table 90

| | U.S.N.[0] | Route_Pending[0] | Route_Timestamp[0] | Next_Hop[0] |
|---|---|---|---|---|
| 0 | U.S.N.[0] | Route_Pending[0] | Route_Timestamp[0] | Next_Hop[0] |
| 1 | U.S.N.[1] | Route_Pending[1] | Route_Timestamp[1] | Next_Hop[1] |
| . | | | | |
| n | U.S.N.[n] | Route_Pending[n] | Route_Timestamp[n] | Next_Hop[n] |
| 100 | 92 | 94 | 96 | 98 |

Fig. 5

Route Request Packet    110

| Destination | U.S.N. | Route_Log |
|---|---|---|
| 112 | 114 | 116 |

Fig. 6

Route Update Packet    130

| Destination | U.S.N. | Route_Log |
|---|---|---|
| 132 | 134 | 136 |

Fig. 7

QoS Reservation Request Packet    150

| Flow_ID | Requested_QoS | Route_Log |
|---|---|---|
| 152 | 154 | 156 |

Fig. 8

QoS Reservation Response Packet    170

| Flow_ID | Time_Interval | Route_Log |
|---|---|---|
| 172 | 174 | 176 |

Fig. 9

QoS Reservation Rejection Packet    190

| Flow_ID | Route_Log |
|---|---|
| 192 | 194 |

Fig. 10

WIRELESS INFRASTRUCTURE ACCESS NETWORK AND METHOD FOR COMMUNICATION ON SUCH NETWORK

FIELD

This disclosure relates to a wireless infrastructure access network and method of communication over such a network and, in particular, such network having and method using a plurality of wireless-enabled network nodes (WNNs) with a wireless-enabled infrastructure gateway node (WIG).

BACKGROUND

Computers and workstation terminals, among other devices, have long been organized into networks to allow the various devices, or "nodes," that are members of the network to transmit and receive data and instructions to and from the other nodes in the network. Information may be passed directly from node to node, or intermediate nodes may relay or route data from the transmitting node to the intended final destination. Industry standard protocols facilitate the communication of nodes within the network. In addition to the nodes themselves, and the protocols that are used for inter-node communication, networks may have a physical infrastructure to allow for the communication among nodes. This infrastructure may either be hard-wired, where communications stay on distinct, physical lines, such as phone lines and fiber optic cables, by wireless communication, where communication is broadcast and received via radio waves, wires and cables being generally replaced with transmitters/receivers and antennas, or a combination of the above.

A node that possesses both a wireless transmitter/receiver that is capable of communicating with the other networked nodes and the communication scheme used by the network may communicate directly with any other node in the wireless network that is within a limited transmit/receive radius from the transmitting node. Communication such as messages that inform nodes within the receive distance of the transmitting node of the existence of the transmitting node in the network, instructions relating to communicating within the network, and bursts of data, called "packets," may be transmitted and received directly among the various nodes of the network. However, this ability to communicate directly among nodes is inherently limited by both the physical distance and physical obstructions between individual nodes.

Where the distance is too great the signal will degrade and the information received by the destination node will be unreliable or entirely undetectable. Where an obstruction exists between the two nodes, such as walls, buildings or terrain, the signal may be physically blocked from reaching the destination node. Additionally, where the wireless communication is based on the transmission and propagation of electromagnetic waves, the transmitted electromagnetic ways may be subject to interference from other electromagnetic waves that exist in the environment, both from natural and man made sources. Whatever the reason, it may not be possible for every node in a network to communicate directly with every other node in the network.

However, two nodes that are unable to communicate directly, either at all or only in an unreliable manner, may nevertheless be able to communicate indirectly. A third node may be physically positioned in the network such that it may establish reliable communication with both the transmitting and receiving node. The third node may then act as a relay between the two communicating nodes by retransmitting messages it receives from each node that is intended for the other node. The method of using an intermediate node to relay messages between nodes that cannot communicate directly is inherently scaleable, and multiple nodes may be used as relay nodes to facilitate communication by nodes that may be separated by wide physical distances.

In order for a system that utilizes intermediate nodes to facilitate indirect communication among various nodes to function efficiently, it may be necessary for each node to maintain separate lists of all of the nodes in the network, all of the nodes with which that particular node may communicate directly, and which nodes should be used as relay nodes to reach nodes that cannot be reached directly. In other words, each node may need to know the "paths" that route through intermediate relay nodes that the node in question may use to communicate with the other nodes in the network. When the transmitting node knows which path to take to reach a destination node, the transmitting node may direct the communication down that particular path, thereby increasing network efficiency and cutting down on transmit time. And just as each node may maintain the various lists described above, network efficiency may be improved if each node also maintains a list of each path of which that particular node is a part, thereby facilitating the creation of new paths in the event those nodes are added to or deleted from the network.

A network where the positioning and membership of the nodes in the network does not change, a "static" network, may establish and maintain paths among the nodes comparatively easily. Because the physical characteristics of the static network do not frequently change there may be little need to vary paths among nodes. However, many wireless networks are not static. Instead, new nodes may be added and subtracted frequently. Nodes may physically moved or repositioned, altering the direct communication relationships among the nodes. New obstructions may arise to interfere with established paths. A "fluid" situation such as this creates uncertainty as to whether communication among nodes that is possible at any given time will still be possible at a future time, and whether communication among nodes that is not possible will become possible. A static network that tries to function in a fluid environment may quickly become overwhelmed. For this reason, "ad hoc" networks, that allow for nodes to join, move around in, and leave networks seamlessly, have been developed.

One such basic multiple hop, ad hoc wireless communication system is known as the Source-initiated Adaptive Routing Algorithm, or SARA. Every node in a wireless network regularly transmits a message identifying itself as a member of the network. These messages are received by all nodes within range of the node in question, and the receiving nodes also relay the identification message to a node that serves as the network manager. Each node maintains a list of the nodes that are within direct communication range, as well as all of the nodes in the network. When a first node needs to communicate with a second node through a relay path it sends a request message out to the network. As the message propagates through the network, the various paths that the request message takes are recorded, and the first request message to reach the destination node establishes the "best effort" pathway between the two nodes. A confirmation message is sent back to the first node, and subsequent communications between these nodes are conducted down this path, until the path is broken, a predetermined length of time has passed, or any node deliberately breaks off the path.

SUMMARY

It may be desirable for ad hoc networks to be efficient at quickly establishing reliable routes between and among the various nodes of the network. Further, whether or not the route that has been established is actually the most efficient route may also be desired to be known. Overall network efficiency may often go well beyond how quickly new nodes may be added to the network. Once a node is a member of the network, an efficient network may tend to minimize the amount of time that is required to conduct transactions between nodes by maximizing the resources of the network, comprised primarily of the bandwidth between and among various nodes, and computing power devoted to managing the flow of communication among the nodes.

There are a number of possible means by which the network may be most efficiently utilized. A protocol may require nodes to communicate by using as few intermediary nodes as possible. Nodes may communicate by proceeding from node-to-node on the basis of which direct communication line has the largest overall bandwidth, with the information moving at high speed for as long as it takes to reach the destination node. Alternatively, if a transmitting node knows, before it begins to transmit, which path, at that moment, has the most unutilized bandwidth, the network's overall bandwidth resource may be most efficiently utilized.

By including in normal network management steps the information from each node pertaining to the amount of the nodes' bandwidth that is unutilized, and the average packet latency for that node, among other factors, a node devoted to managing the routing of network communication may determine communication paths between and among nodes that utilize network resources more efficiently than may be realized by simply using default communication routes. By constantly adjusting the paths network communications follow based on current utilization of network resources, the network will tend to realize faster and more reliable communication among the various nodes.

In an embodiment, a method of communication in a wireless infrastructure access network has a plurality of wireless-enabled network nodes (WNNs), with a wireless-enabled infrastructure gateway node (WIG). A default unidirectional route from each of the plurality of wireless-enabled network nodes (WNNs) is established to the wireless-enabled infrastructure gateway node (WIG). A bi-directional packet pathway over the wireless infrastructure access network is established between any given one of the wireless-enabled network nodes (WNNs) and the wireless infrastructure gateway node (WIG) that satisfies a specified quality of service (QoS).

In an embodiment, the establishing a default unidirectional route step comprises transmitting a plurality of beacon messages from the wireless-enabled infrastructure gateway node (WIG) at periodic intervals.

In an embodiment, each one of the plurality of wireless-enabled network nodes (WNNs) maintains the sequence number of a last one of the plurality of beacon messages processed by the one of the plurality wireless-enabled network nodes (WNNs). One of the plurality of beacon messages originated by the wireless-enabled infrastructure gateway node (WIG) is discarded if the sequence number of the one of the plurality of beacon messages is less than or equal to the sequence number of another of the plurality of beacon messages processed by each one of the plurality of wireless-enabled network nodes (WNNs). Each of the plurality of beacon messages originated by the wireless-enabled infrastructure gateway node (WIG) is processed, comprising the sub-steps of transmitting the one of the plurality of beacon messages to all one-hop neighbors of each of the plurality of wireless-enabled network nodes (WNNs) and setting a next-hop for the default route to the wireless-enabled infrastructure gateway node (WIG) to be the wireless-enabled network nodes (WNNs) from which the one of the plurality of beacon messages was received.

In an embodiment, the processing each of the of plurality of beacon messages is accomplished in each of the plurality of wireless-enabled network nodes (WNNs).

In an embodiment, a specified amount of network bandwidth for network control traffic transported over the default route to the wireless-enabled infrastructure gateway node (WIG) is apportioned within each of the plurality of wireless-enabled network nodes (WNNs).

In an embodiment, each of the plurality of beacon messages comprises a wireless address of the wireless-enabled infrastructure gateway node (WIG) and a unique sequence number generated by the wireless-enabled infrastructure gateway node (WIG).

In an embodiment, the unique sequence number generated by the wireless-enabled infrastructure gateway node (WIG) monotonically increase for each subsequent one of the plurality of beacon messages.

In an embodiment, the sequence number is generated from a time source that provides a universal time coordinate (UTC).'

In an embodiment, the sequence number is generated within the wireless-enabled infrastructure gateway node (WIG).

In an embodiment, no two consecutive ones of the plurality of beacon messages are generated at a same universal time coordinate (UTC).

In an embodiment, the step of establishing a bi-directional packet pathway comprises transmitting, at periodic intervals, a plurality of status messages from each of the plurality of wireless-enabled network nodes (WNNs) to the wireless-enabled infrastructure gateway node (WIG) with the status message being routed to the wireless-enabled infrastructure gateway node (WIG) over the default unidirectional route from each of the plurality of the wireless-enabled network nodes (WNNs) to the wireless-enabled infrastructure gateway node (WIG). Then the plurality of status messages received by the wireless-enabled infrastructure gateway node (WIG) are processed to form a current wireless infrastructure access network picture that depicts prevailing connectivity of the wireless infrastructure access network and available network resources at each of the plurality of wireless-enabled network nodes (WNNs).

In an embodiment, the processing the plurality of status messages is accomplished at a network manager node within the wireless infrastructure access network.

In an embodiment, each one of the plurality of status messages indicates the presence of one of the plurality of wireless-enabled network nodes (WNNs) originating the one of the plurality of status messages, presence of any one-hop neighbors of the one of the plurality of wireless-enabled network nodes (WNNs) and the available network resources at the one of the plurality of wireless-enabled network nodes (WNNs).

In an embodiment, each one of the plurality of status messages further carries a unique sequence number derived from a monotonically increasing source of sequence numbers.

In an embodiment, the unique sequence number is derived at the one of the plurality of wireless-enabled network nodes (WNNs).

In an embodiment, the establishing of a bi-directional packet pathway involves one of the plurality of wireless-enabled network nodes (WNNs) transmitting a provisional request message for a requested route to the wireless-enabled infrastructure gateway node (WIG) indicating a desired quality of service (QoS) along each direction of the requested route. The provisional request message is relayed to the wireless-enabled infrastructure gateway node (WIG) using the default route from the one of the plurality of wireless-enabled network nodes (WNNs) to the wireless-enabled infrastructure gateway node (WIG). The provisional route request message is relayed from the wireless-enabled infrastructure gateway node (WIG) to the network manager node. The provisional route request message is processed to discover from the wireless infrastructure access network picture any available bi-directional route between the one of the plurality of wireless-enabled network nodes (WNNs) and the wireless-enabled infrastructure gateway node (WIG) that satisfies the quality of service (QoS) attributes specified in the provisional route request message. The network manager node sends a response to the wireless-enabled infrastructure gateway node (WIG) specifying a bi-directional route between the wireless-enabled infrastructure gateway node (WIG) and the one of the plurality of wireless-enabled network nodes (WNNs) if the available bi-directional route is discovered. The response is relayed to the one of the plurality of wireless-enabled network nodes (WNNs) over the available bi-directional route between the wireless-enabled infrastructure gateway node (WIG) and the one of the plurality of wireless-enabled network nodes (WNNs).

In an embodiment, the response to the provisional route request message from one of the plurality of wireless-enabled network nodes (WNNs) originates at the network manager node.

In an embodiment, the processing of the provisional route request message is performed by the network manager node.

In an embodiment, the response from network manager node is relayed to the one of the plurality of wireless-enabled network nodes (WNNs) by the wireless-enabled infrastructure gateway node (WIG).

In an embodiment, the provisional route request message from the one of the plurality of wireless-enabled network nodes (WNNs) is associated with a flow identifier and wherein the response to the provisional route request message from the network manager node is also associated with the flow identifier.

In an embodiment, the response from the network manager node is processed by each of the plurality of wireless-enabled network nodes (WNNs) on the available bi-directional route between the wireless-enabled infrastructure gateway node (WIG) and one of the plurality of wireless-enabled network nodes (WNNs) originating a particular one of the plurality of status messages by updating a routing table at the particular one of the plurality of wireless-enabled network nodes (WNNs) with a next hop entry for the flow identifier in the response.

In an embodiment, each of the plurality of status messages is indicative at least in part of bandwidth utilization of the wireless infrastructure access network at one of the plurality of wireless-enabled network nodes (WNNs) originating a particular one of the plurality of status messages.

In an embodiment, each of the plurality of status messages is indicative at least in part of packet queuing latency encountered at one of the plurality of wireless-enabled network nodes (WNNs) originating a particular one of the plurality of status messages.

In an embodiment, each of the plurality of status messages is indicative at least in part of residual energy at one of the plurality of wireless-enabled network nodes (WNNs) originating a particular one of the plurality of status messages.

In an embodiment, the quality of service (QoS) attribute comprises a number of hops on the available bi-directional route between one of the plurality of wireless-enabled network nodes (WNNs) and the wireless-enabled infrastructure gateway node (WIG).

In an embodiment, one of the plurality of wireless-enabled network nodes (WNNs) requesting the available bi-directional route retries the provisional request message if no response is received within a predetermined time interval.

In an embodiment, the wireless infrastructure access network has a plurality of wireless-enabled infrastructure gateway nodes (WIGs) and wherein one of the plurality of wireless-enabled network nodes (WNNs) requesting the available bi-directional route from one of the plurality of wireless-enabled infrastructure gateway nodes (WIGs) transmits the provisional route request to another one of the plurality of the wireless-enabled infrastructure gateway nodes (WIGs) if one of the plurality of wireless-enabled network nodes (WNNs) does not receive the response after a predetermined number of tries.

In an embodiment, the quality of service (QoS) attribute comprises bandwidth.

In an embodiment, the quality of service (QoS) attribute comprises latency.

In an embodiment, the quality of service (QoS) attribute comprises expended energy.

In an embodiment, a wireless infrastructure access network includes a plurality of wireless-enabled network nodes (WNNs), each of being capable of periodically wirelessly sending a status message indicative of a presence of each respective one of the plurality of wireless-enabled network nodes (WNNs) on the wireless infrastructure access network and any known neighbors of the respective one of the plurality of wireless-enabled network nodes (WNNs). A network manager node connected to the wireless infrastructure access network determines a network picture of the wireless infrastructure access network from the status message from each of the plurality of wireless-enabled network nodes (WNNs). A wireless-enabled infrastructure gateway node (WIG) has a wireless interface and a network interface for connecting to an internet infrastructure. Each one of the plurality of wireless-enabled network nodes (WNNs) is capable of wirelessly sending a provisional route request message specifying a desired quality of service (QoS) attribute on a bi-directional route between the one of the plurality of wireless-enabled network nodes (WNNs) and the wireless-enabled infrastructure gateway node (WIG). The network manager node determines the bi-directional route from the one of the plurality of wireless-enabled network nodes (WNNs) to the wireless-enabled infrastructure gateway node (WIG) which accommodates the quality of service (QoS) attribute based, at least in part, on the provisional route request and the network picture of the wireless infrastructure access network. The network manager node wirelessly sends a response to the provisional route request to the wireless-enabled infrastructure gateway node (WIG) specifying the bi-directional route. The wireless-enabled infrastructure gateway node (WIG) relays the response to the one of the plurality of wireless-enabled network nodes (WNNs).

In an embodiment, the network manager node and the wireless-enabled infrastructure gateway node (WIG) are the same.

In an embodiment, the response is sent using the bi-directional route discovered by the network manager node.

In an embodiment, the response originates with the network manager node.

In an embodiment, the response is relayed by the wireless-enabled infrastructure gateway node (WIG) to the one of the plurality of wireless-enabled network nodes (WNNs).

In an embodiment, the provisional route request is associated with a flow identifier and wherein the response is also associated with the flow identifier.

In an embodiment, the status message indicates bandwidth utilization of wireless network at the one of the plurality of wireless-enabled network nodes (WNNs) originating a particular one of the plurality of status messages.

In an embodiment, the quality of service (QoS) attribute comprises a number of hops among the plurality of wireless-enabled network nodes (WNNs) on a desired route between the plurality of wireless-enabled network nodes (WNNs) and the wireless-enabled infrastructure gateway node (WIG).

DRAWINGS

FIG. 2 is a block diagram of a status message;

FIG. 4 is a block diagram of a neighbor table;

FIG. 5 is a block diagram of a route table;

FIG. 6 is a block diagram of a route request packet;

FIG. 7 is a block diagram of a route update packet;

FIG. 8 is a block diagram of a QoS reservation request packet;

FIG. 9 is a block diagram of a QoS reservation response packet;

FIG. 10 is a block diagram of a QoS reservation rejection packet; and

FIGS. 11*a*-11*g* are block diagrams of the overall network operation.

DESCRIPTION

Figure 1:
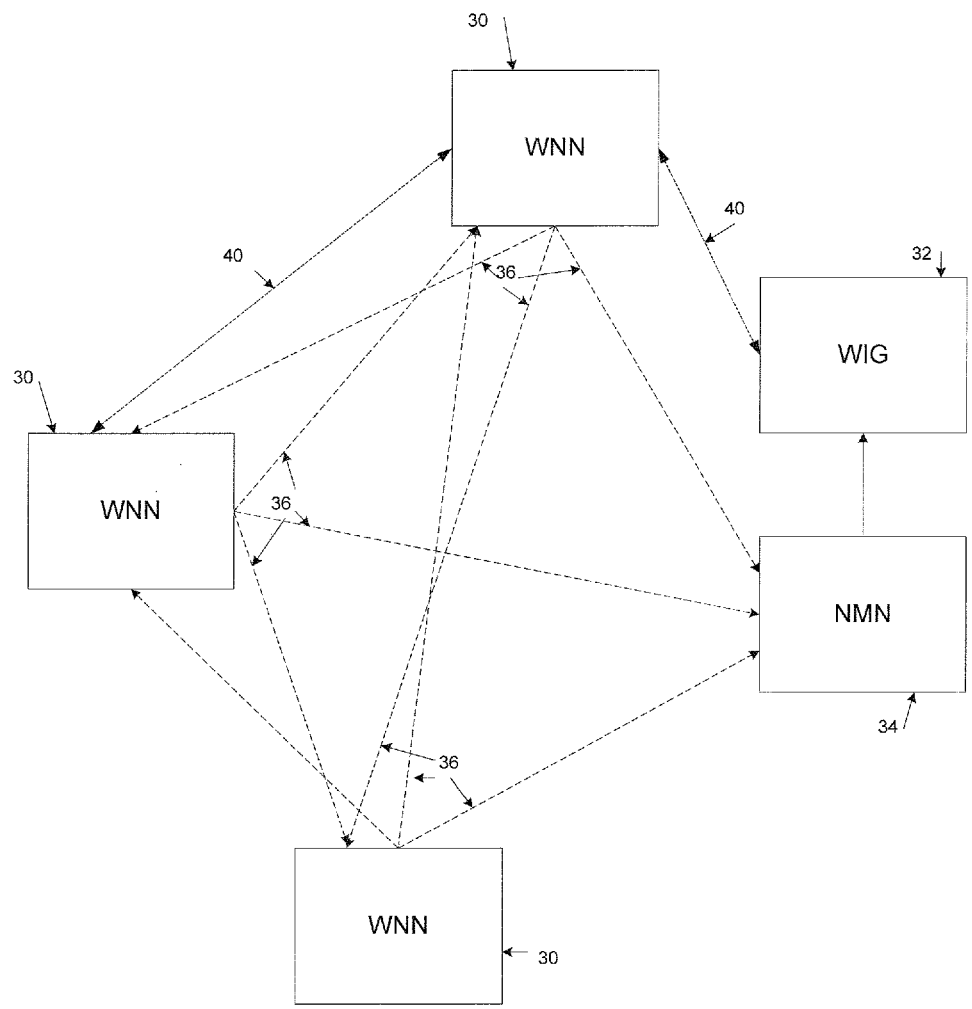
FIG. 1 is a block diagram of an embodiment of a typical wireless network.

FIG. 1 shows a block diagram of an example of an ad hoc network where all of the nodes in the network transmit wireless communications at an approximately similar transmit power. The network is comprised of a plurality of Wireless-enabled Network Nodes (WNNs) 30, for example, personal computers or workstations including off-the-shelf hardware, such as network interface cards, suitable for communicating through various wireless standards, such as 802.11, utilizing in an embodiment the industry standard TCP/IP protocol suite. The network is further comprised of Wireless-enabled Internet Gateway (WIG) 32, for example, a personal computer including off-the-shelf hardware suitable for wireless communication, for example through the 802.11 standard, and that connects to an internet service provider's router. The network is further comprised of Network Management Node (NMN) 34, which may either be an independent node such as WNN 30, or may, in an embodiment, be an integral component of WIG 32. In an embodiment, each WNN 30 is initially configured "knowing" the network address of WIG 32 and NMN 34.

WNNs 30 and WIG 32 of a source-initiated adaptive routing algorithm (SARA) network may be installed with an intermediate driver or "shim" between the driver for the node's physical network interface card and the node's TCP/IP stack. This configuration allows for source-initiated adaptive routing algorithm to control how information is placed and popped of the TCP/IP stack, according to the requirements of the algorithm.

WNNs 30 periodically transmit Status Messages 50 (FIG. 2) down unidirectional paths 36 to any and all nodes that are within range of the WNN's wireless transmitter. A path is defined as any communication route between two nodes. A unidirectional path, therefore, is a path over which a receiving node may not transmit a reply back to the node that transmitted. A node that is beyond the range cannot receive the transmitting node's status message. These status messages are used by the receiving nodes to determine which nodes are within transmit distance, and are therefore neighbors. FIG. 2 shows Status Message 50, which is comprised of: block 52 for a unique identifier of the transmitting WNN; block 54 for the unique identifiers of all of the nodes that the transmitting WNN, according to its most recent information, has as neighbors; block 56 indicative of the available network resources at the transmitting WNN; and block 58 including a Unique Sequence Number (USN) that identifies a relative time at which the Status Message was transmitted. In addition, block 60 specifies a particular Destination to which Status Message 50 is to be directed. In an embodiment, every status message is sent to NMN 34 in addition to all neighbors. In an embodiment, every status message also includes the network address of WIG 32 and NMN 34.

Figure 3:
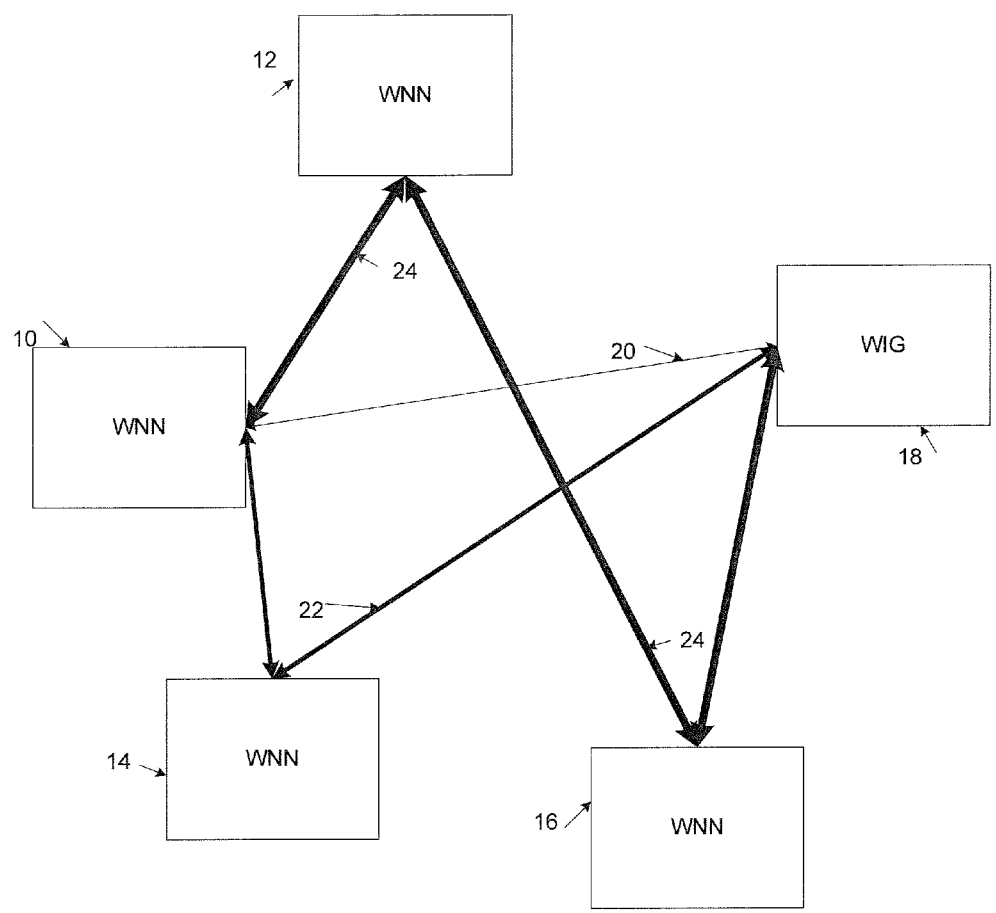
FIG. 3 is a block diagram of a wireless network illustrating the quality of service among the various nodes.
Figure 11A:
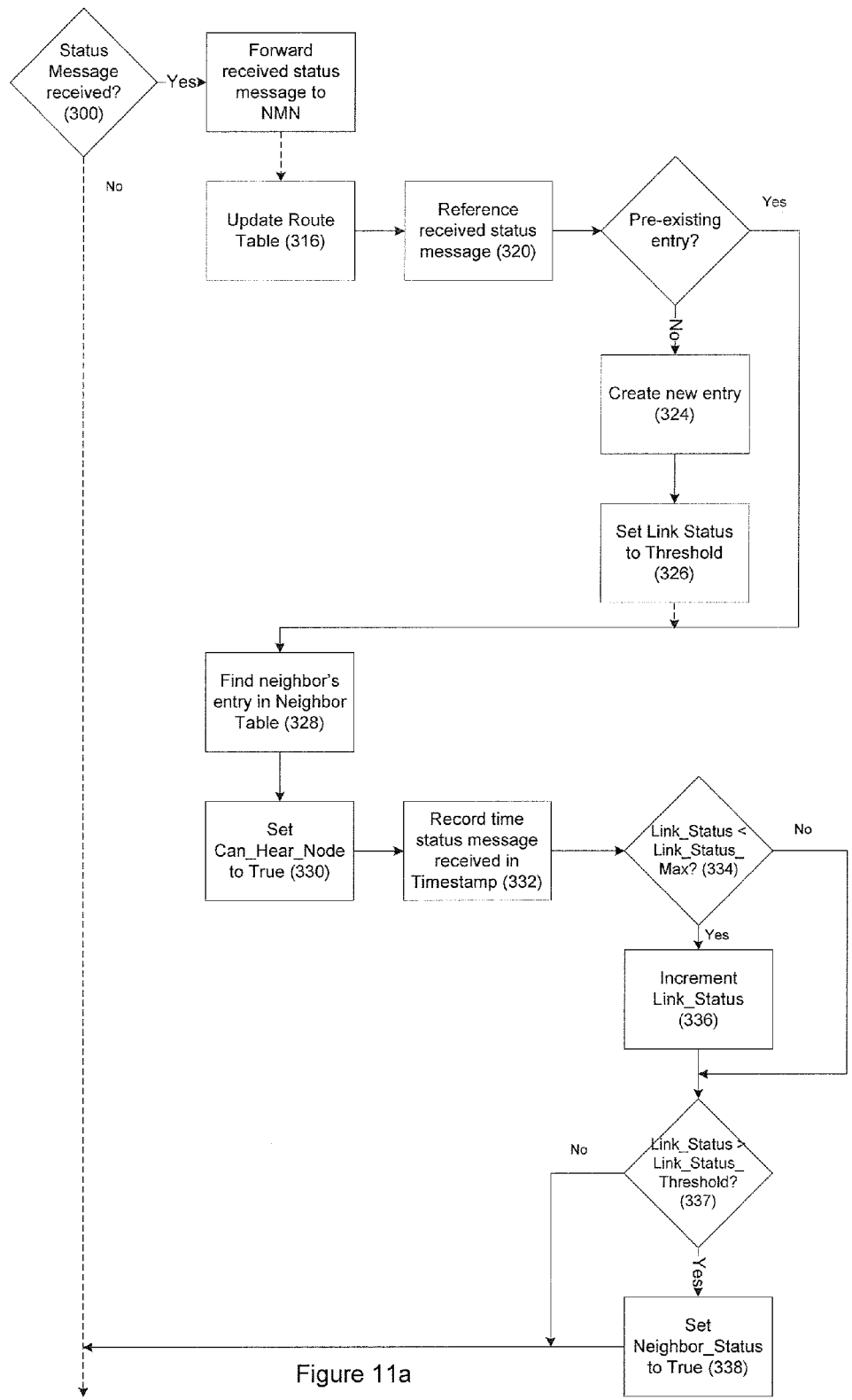
Figure 11B:
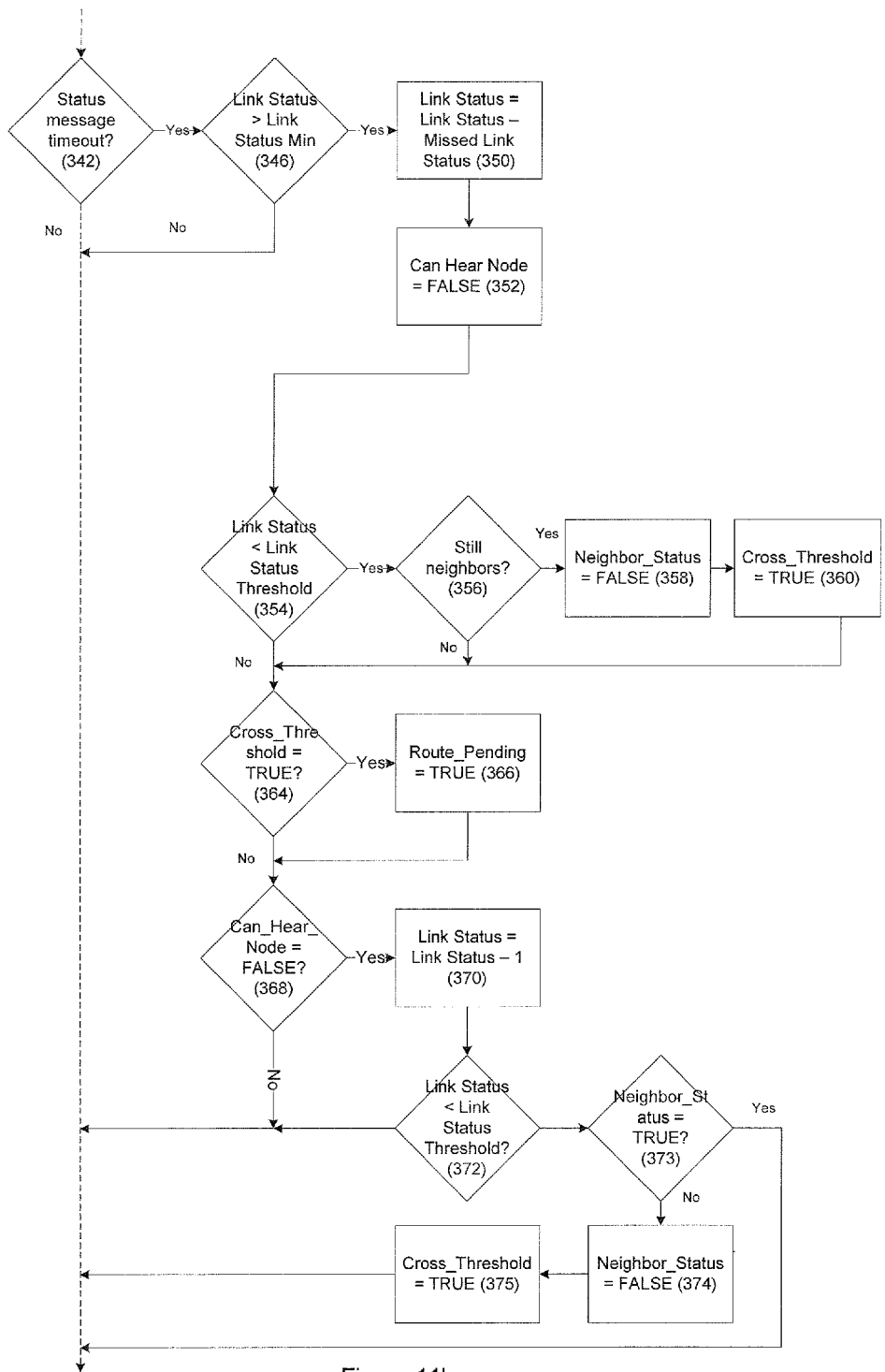
Figure 11C:
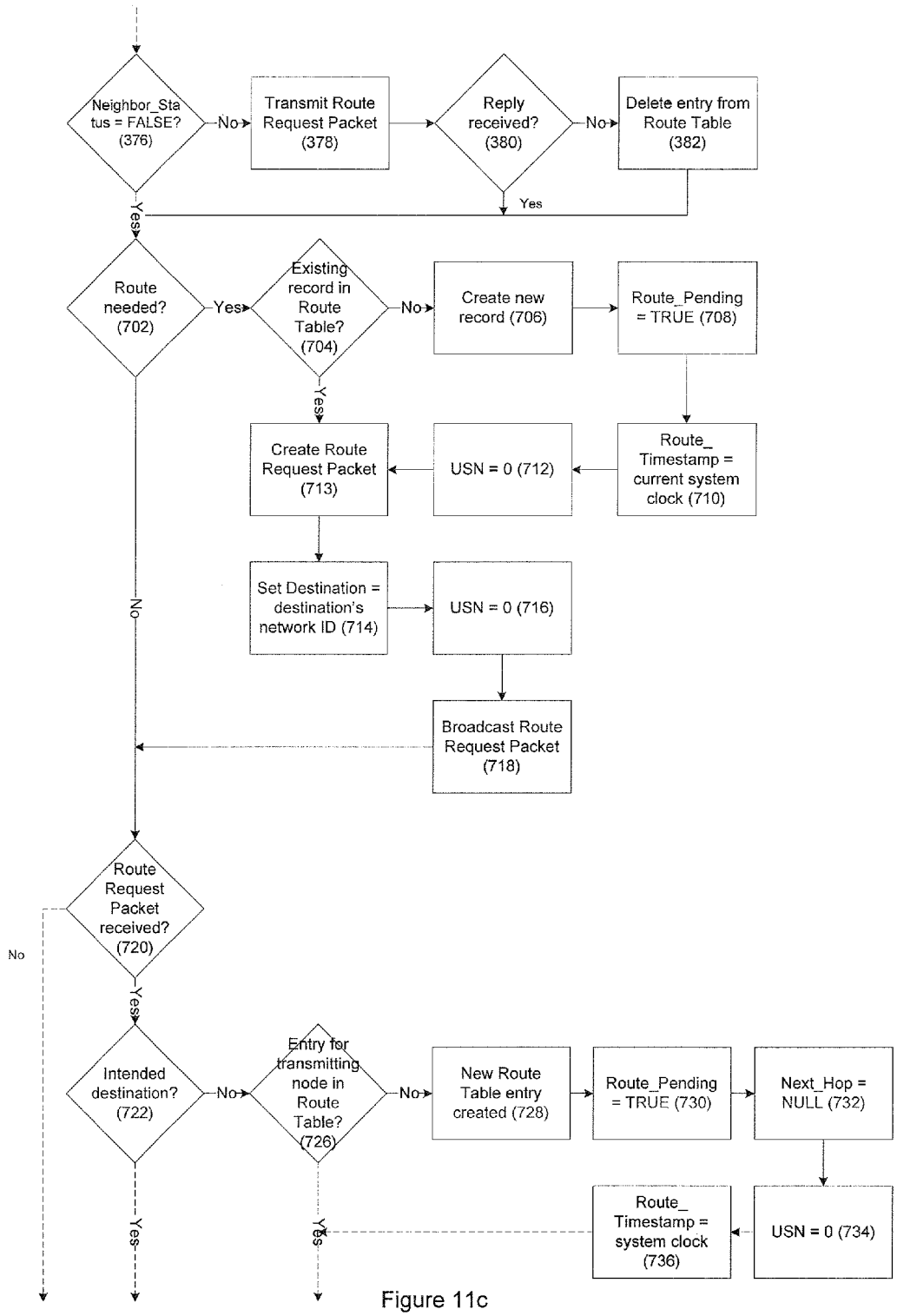
Figure 11D:
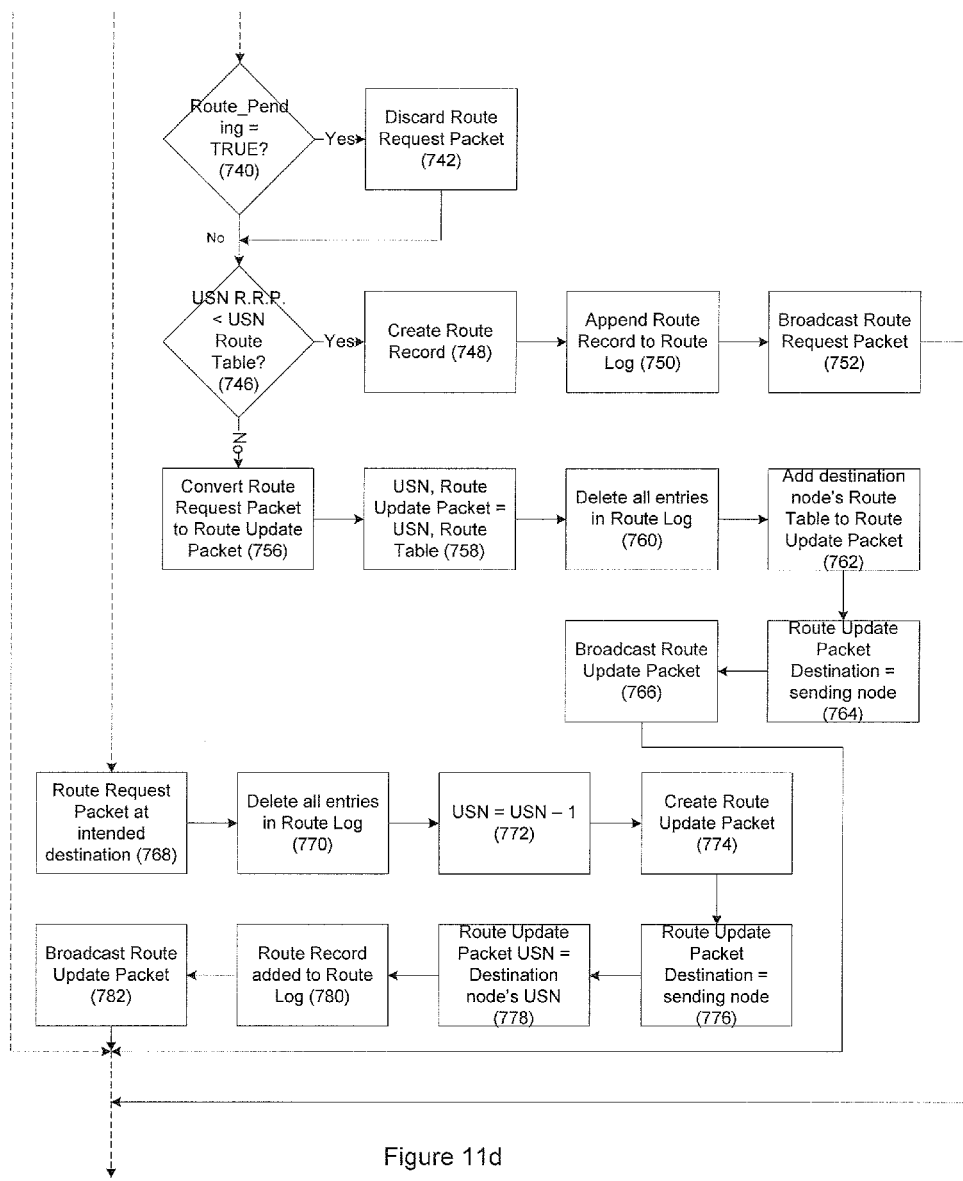
Figure 11E:
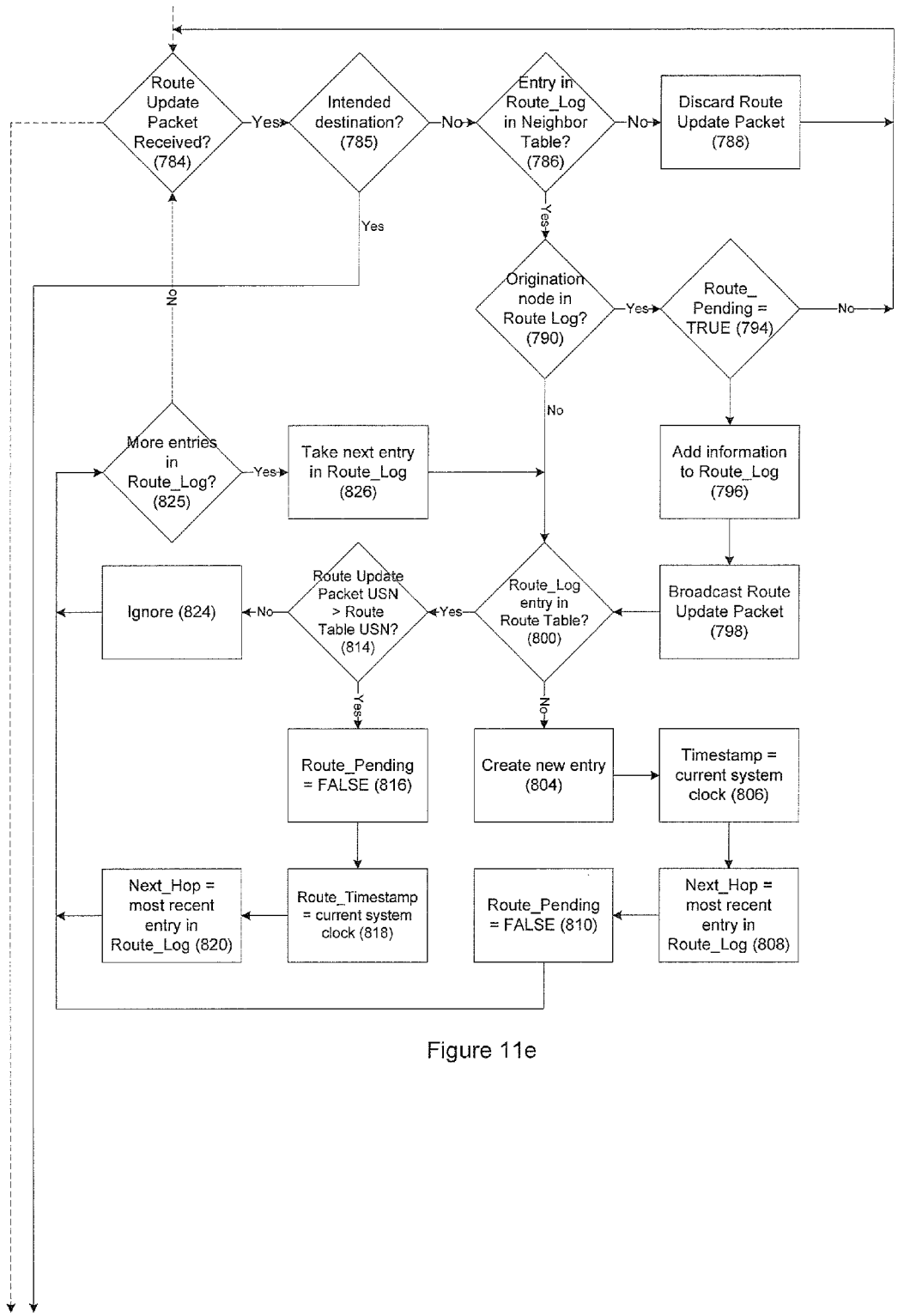
Figure 11F:
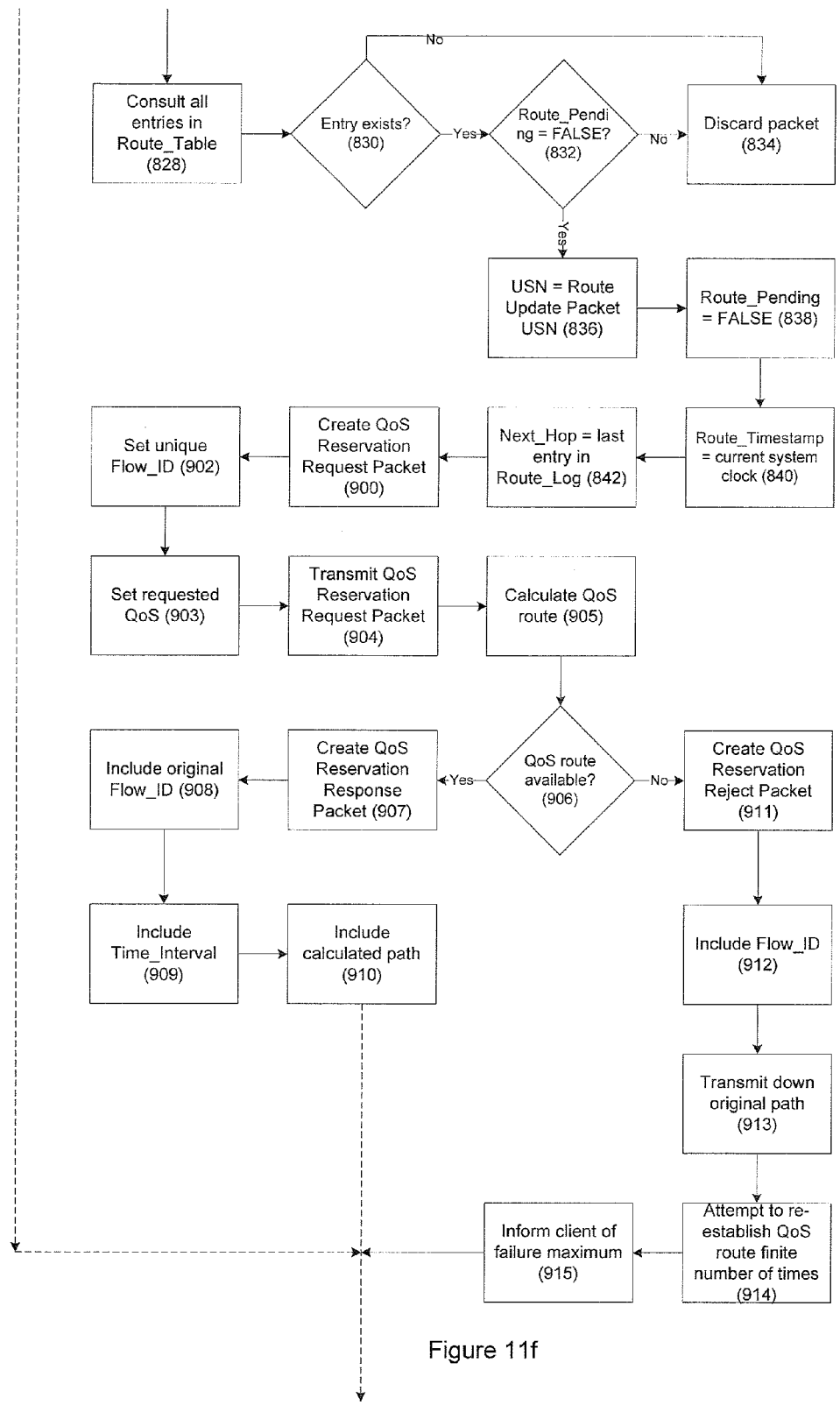
Figure 11G:
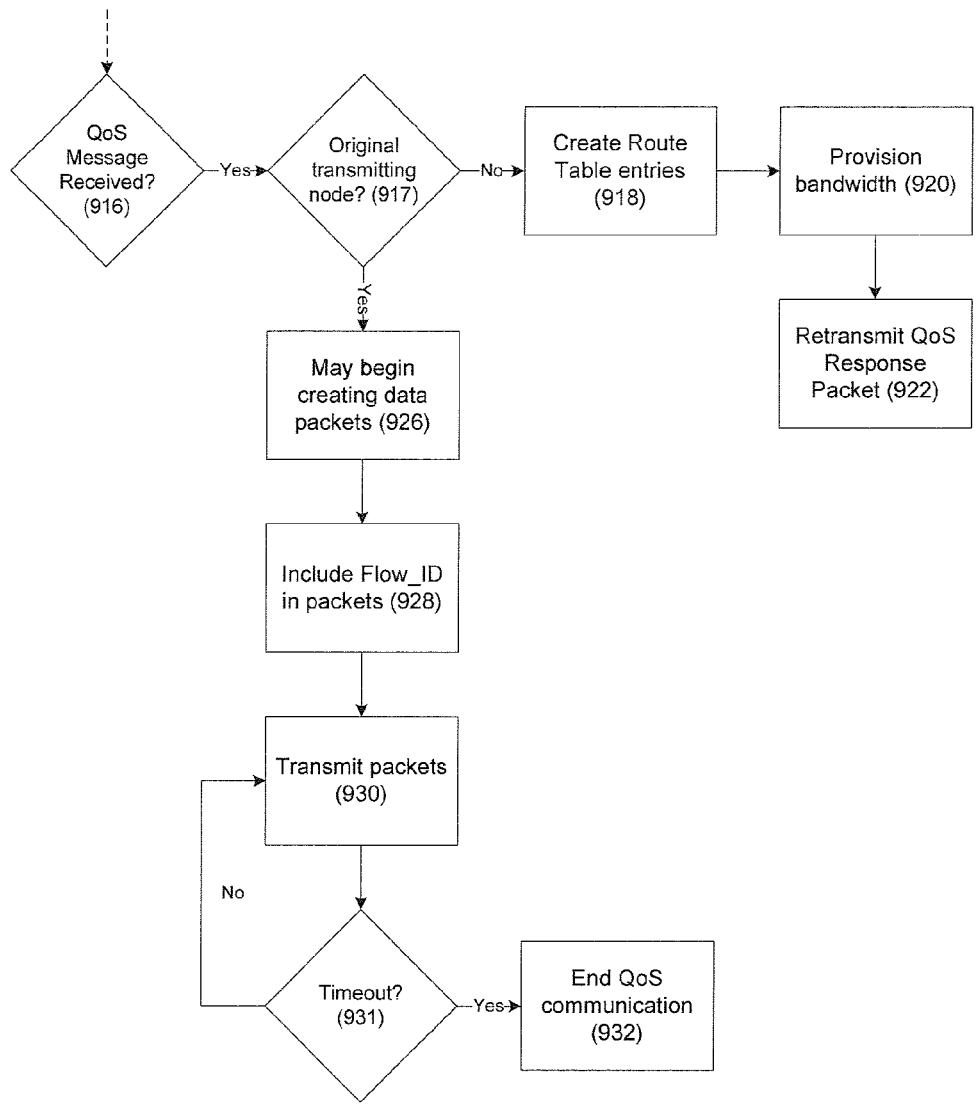

WNNs 30 may establish bi-directional paths 40 (i.e., a path between two nodes over which the receiving node may transmit a response) for communication with WIG 32, which may either be direct, or involve multiple "hops" through intermediate nodes. FIG. 3 shows an example of the possible paths over which WNN 10 may communicate with WIG 18. If WIG 18 is a neighbor of WNN 10 they may communicate directly via direct path 20. If WIG 18 is not within range for direct communication, the source-initiated adaptive routing algorithm may direct the communication to take place via multi-hop paths, such as path 22 that passes through WNN 14, or, for example, path 24 that passes through a plurality of other WNNs 12 and 16.

The source-initiated adaptive routing algorithm may be modified to take into account quality of service. For instance, if the thickness of the arrow of the path represents an aggregate of the efficiency with which communications on that path occur, then it would be preferable to use path 24, which requires using two intermediate nodes, over path 22, which requires the use of only one intermediate node, in order to communicate between WNN 10 and WIG 18.

Multiple issues factor into the overall quality of service along a path. For instance, the quality of the wireless signal between two nodes may improve or reduce the amount of data that may be transmitted over a given time period. Factors that may impact signal quality include, but are not limited to: changes in the physical distance between nodes; the introduction of physical obstructions between nodes; the existence of environmental electromagnetic interference; the characteristics of the nodes' network interface cards. The addition of intermediate nodes along a path will tend to increase the amount of time it takes to traverse the path due to the additional time required for each intermediate node to receive and retransmit the data, for reasons that include, but are not limited to: the speed with which the node processes data internally; the time inherently required to receive and retransmit data; whether the node is acting as an intermediate node in any other paths; whether the node is transmitting or receiving data as either a start or end-point of a different path. All of the above factors may change over time, some very frequently. Thus, which pathway should be followed between two nodes in order to maximize quality of service may tend to change frequently.

Referring back to the abstract example from FIG. 3, suppose direct paths between nodes, free of all interference, could typically operate at 12.0 megabits per second. If WNN 10 moved, resulting in a large object coming between WNN 10 and WIG 18, the amount of interference on path 20 might reduce the data rate to 0.5 megabits per second. An algorithm that did not factor in quality of service would continue to use direct path 20, and the amount of information per unit time that could be transmitted between WNN 10 and WIG 18 would be reduced by approximately 96%.

An algorithm that does factor in quality of service, however, would then compare the quality of service of path 20 with that of path 22 and path 24. If for example, a typical node adds 0.1 seconds of latency to a transmission, and a typical message includes 12.0 megabits, each node that was passed through would, simplistically for the sake of this example, reduce the data rate of the path it was on by 1.0 megabits. Thus, the tendency would be for path 22, which involves only one intermediate node, to have a higher data rate than path 24, which involves two intermediate nodes. But if WNN 14 on path 22 is a node comprised of relatively old equipment, the latency for WNN 14 may actually be 0.25 seconds. Thus, the total latency introduced by the two nodes of path 24 would be less than the latency introduced by the single node of path 22. An algorithm that did not factor in the changes to quality of service that arise out of the physical characteristics of the nodes would be incapable of recognizing that the best utilization of network resources would be to route communication between WNN 10 and WIG 18 along path 24, rather than along direct path 20, or the path with fewer intermediate nodes, path 22.

The algorithm, illustrated in FIGS. 11a-11g, adapts the source-initiated adaptive routing algorithm to take into account the quality of service among the nodes of the network. A wireless infrastructure access network comprised of nodes, including WNNs 30, a WIG 32, and a NMN 34 will periodically send (300) (FIG. 11a) Status Messages 50 to any known neighbor nodes on the network, which are then forwarded (302) to NMN 34. Based on Status Messages 50, NMN 34 maintains a network picture, including all nodes, all nodes that neighbor each node, and the quality of service between and among nodes. When a node needs to establish a path or "route," it transmits (308) a provisional route request message (or Route Request Packet 110 (FIG. 6) plus QoS Reservation Request Packet 150 (FIG. 8)) specifying a destination node, a desired quality of service, and a flow identifier number (Flow ID 172). When it receives the route request message, NMN 34 determines (310) a bi-directional route from the requesting node to the destination node that meets the required quality of service by factoring in the data from the current network picture. NMN 34 then instructs (312) WIG 32 to transmit down the network a response (QoS Reservation Response Packet 170 (FIG. 9)) setting aside the route related to the flow identifier number for a specified time period.

Each node independently maintains (314) a Neighbor Table 70 (FIG. 4), which contains entries 82 for each node that neighbors the node maintaining the table. Each node's Neighbor Table 70 is comprised of the following fields: Link Status 72, a value representative of the quality of the link between the two nodes; Can Hear Node 74, a flag indicating the receipt of the most recent expected Status Message 50 from the neighboring node; Neighbor Timestamp 76, recording the last time from the system clock that the neighbor's Status Message 50 was received; Neighbor Status 78, a flag indicating that the neighbor's Link Status 72 value is higher than a required threshold; and Cross Threshold 80, indicating that Link Status's 72 required threshold was crossed upon the receipt of the neighbor's most recent Status Message 50.

Each node independently maintains (316) a Route Table 90 (FIG. 5), which contains entries 100 for each destination that may be reached through one or more hops from the node. Each node's Route Table 90 is comprised of the following fields: USN 92; Route Pending 94; Route Timestamp 96; Next Hop 98.

When a Node R (such that a "Node" is defined as either a WNN 30 or WIG 32) receives (320) a Status Message 50, R references (320) the transmitting Node (T) against entries 100 in R's Route Table 90. If no entry 100 for T exists in the Route Table 90 a new entry 100 is created (324) in R's Neighbor Table 70, and the Link Status 72 for T is set (326) to the Link Status Threshold value, which is set by the system administrator any time during or after initial configuration. Regardless of whether T had previously existed in the Neighbor Table 70, R then cycles (328) through all of the members of Neighbor Table 70 until it finds the entry 82 corresponding to T. It sets (330) Can Hear Node 74 in T's entry in the Neighbor Table 70 indicating that T can hear R to TRUE, and records (332) the time the message was received in Neighbor Timestamp 76. If the Link Status 72 value is less than the Link Status Maximum value (334) set by the administrator then the Link Status 72 value is incremented (336) in order to indicate that the link between R and T is relatively strong. If the incremented Link Status 72 value is above the Link Status Threshold (337) then the link is strong enough to consider R and T neighbors and Neighbor Status 78 is set (338) to TRUE.

All Nodes set an amount of time in which the Node must hear from each individual Node on Neighbor Table 70 maintained by the Node. If the Node does not hear from a particular Node within the set timeframe the Node's entry 82 in the Neighbor Table 70 is deleted.

In an embodiment, all Nodes send Status Messages 50 at the same regular intervals. Thus, all Nodes know how frequently they should expect to receive Status Message 50 from each neighboring Node. If a Node R determines (342) (FIG. 11b) that it should have received Status Message 50 from neighboring Node T, but that it has not received Status Message 50, then Link Status 72 value is checked (346) against the Link Status Minimum constant, set by the system administrator any time during or after initial configuration. If Link Status 72 value is higher (348) than the Minimum a constant Missed Link Status value is subtracted (350) from Link Status 72 value. In addition, Can Hear Node 74 is set (352) to FALSE. If Link Status 72 is less than the Link Status Threshold (354) and R and T are still considered neighbors (356) then Neighbor Status 78 is set (358) to FALSE, and Cross Threshold 80 is set (360) to TRUE. If a Status Message 50 is ever missed and Cross Threshold 80 is TRUE (364), then T's status within R's Route Table 90 is disabled (366), but not deleted, by setting Route Pending 94 to true for each entry 100 on the Route Table 90 that includes T.

If Can Hear Node 74 is set (368) to FALSE then Link Status 72 is decremented (370). If that causes Link Status 72 to fall (372) below the Link Status Threshold and Neighbor Status 78 is TRUE (373), then Neighbor Status 78 is set (374) to FALSE and Cross Threshold 80 is set (375) to TRUE.

If the R's status within the Route Table 90 is disabled (376) (FIG. 11c) then T will transmit (378) a Route Request Packet 110 to T in an attempt to reestablish the communication. If the Route Request Packet 110 is not answered (380) then R is deleted (382) from T's Route Table 90.

Nodes may transmit Route Request Packets 110 (FIG. 6) in order to establish route 22 between transmitting node 10 and the destination node 14. A Route Request Packet 110 includes the following fields: Destination 112, the identification of the destination node; USN 114, corresponding to the most recent USN value received by the transmitting node; Route Log 116, the list of nodes through which the Route Request Packet has traversed on its way to the destination node, starting with the transmitting node.

Nodes may also transmit Route Update Packets 130 (FIG. 7) in order to confirm the existence of an established route 22 between transmitting node 10 and destination node 14. A Route Update Packet 130 includes the following fields; Destination 132, the identification of the destination node; USN 134, corresponding to the most recent USN value received by the transmitting node; Route Log 136, the list of nodes through which the route traverses on its way to the destination node, starting with the transmitting node.

When a Node S needs a route to Node D (702), and no record 100 of a route to D exists (704) on S's Route Table 90, S first creates (706) a new record 100 for D in Route Table 90. Route Pending 94 is set (708) to TRUE, Route Timestamp 96 is set (710) to the current value of S's system clock, and USN is set (712) to 0. S then creates (713) Route Request Packet 110, with Destination 112 equal to the identification of D (714), and USN 114 set (716) to 0. S then broadcasts (718) Route Request Packet 110 down all of its unidirectional paths 36.

When a Node B receives (720) a Route Request Packet 110 and B is not Destination 112 (722), B consults its Route Table 90 for an entry 100 for D. If no entry 100 for D is found (726) then a new entry 100 for D is created (728), where Route Pending 94 is TRUE (730), Next Hop 98 is NULL (732), USN 92 is set (734) to 0, and Route Timestamp 96 is set (736) to the current value of the system clock. If B did already have an entry 100 for D, and Route Pending 94 is TRUE (740) (FIG. 11d), then B discards (742) Route Request Packet 110, and B takes no further actions regarding Route Request Packet 110. However, if Route Pending 94 is FALSE, and USN 114 of Route Request Packet 110 is less than USN 92 of Route Table 90 (746), and thus the Route Request Packet 110 is more recent than B's most recent record of a route to D, then B creates (748) its own Route Record and appends (750) it to Route Request Packet's 110 Route Log 116 and broadcasts (752) the Route Request Packet down B's unidirectional paths 36. But if USN 114 of Route Request Packet 110 is less than USN 92 of Route Table 90, and thus Route Request Packet 110 is older than D's entry 100 on B's Route Table 90, then Route Request Packet 110 is converted (756) into Route Update Packet 130. The conversion is performed by setting (758) Route Update Packet's 130 USN 134 to USN 92 of Route Table 90, deleting (760) all entries in Route Update Packet's 130 Route Log 136, appending (762) D's entry 100 in Route Table 90 to Route Update Packet's 130 Route Log 136, and setting (764) Route Update Packet's 130 Destination 132 to the identification for S. Route Update Packet 130 is then broadcast (766) down all of B's unidirectional paths 36.

If D receives (768) a Route Request Packet 110 with D as the Destination 112, then all entries in Route Log 116 are deleted (770), and D's USN, which is maintained at the system level, is incremented (772). Then Route Update Packet 130 is created (774), with Destination 132 set (776) as S's identification, USN 134 set (778) at D's system USN, and D's Route Record 100 appended (780) to Route Log 136. Route Update Packet 130 is then broadcast (782) down all of D's unidirectional paths 36.

If B receives (784) (FIG. 11e) Route Update Packet 130 with D as Destination 132 (785), and the most recently added entry in Route Log 136 is not on B's Neighbor Table 70 (786), then Route Update Packet 130 is discarded (788). B then consults (790) Route Log 136 for D's entry. If B's Route Table 90 has an entry 100 for D and Route Pending 94 is (794) TRUE then that means that Route Request Packet 110 came through B, and thus B is on the successful route. Accordingly, B appends (796) its information to Route Log 136 and broadcasts (798) Route Update Packet 130 down all of B's unidirectional paths 36.

B then consults (800) all of the rest of the entries in Route Log 136 individually. For each entry N, if Route Table 90 does not have entry 100 for N, new entry 100 is created (804) to correspond to N. Route Timestamp[N] 96 is set (806) to the current value of B's system clock, Next Hop 98 is set (808) to the identification of B's neighbor from which Route Update Packet 130 was sent, and Route Pending 94 is set (810) to FALSE. If Route Table 90 did have entry 100 for N (812), and Route Update Packet's 130 USN 134 is greater (814), and therefore more current, than Route Table 90 USN[N] 92, then Route Pending[N] 94 is set (816) to FALSE, Route Timestamp 96 is set (818) to B's current system clock value, and Next Hop 98 is set (820) to the identification of B's neighbor form which Route Update Packet 130 was set. If USN[N] 92 is greater than USN 134 then B's entry 100 for N is more current than the information in Route Request Packet 110, and N is ignored (824). If there are additional entries in Route Log 136 (825), then the next one is checked (826) against Route Table 90, until all Route Log entries 136 have been checked.

When Node S receives a Route Update Packet 130 from D, S consults (828) (FIG. 111) all of the entries in Route Table 90 for entries for D. If the D entry exists (830) and Route Table Route Pending 94 is FALSE (832) the entry is discarded (834). If Route Table Route Pending 94 is TRUE, then USN 92 is set (836) to the value of Route Update Packet USN 134, Route Pending 94 is set (838) to FALSE, Route Timestamp 96 is set (840) to the current value of S's system clock, and Next Hop 98 is set (842) to the most recent entry in Route Update Route Log 136.

In an embodiment, once route 40 has been established, WNN 30 which initiated the route request uses established route 40 as the default "best-effort" route, and the second phase of the connection set-up process begins. WNN 30 transmits (900) Quality of Service (QoS) Reservation Request message 150 to NMN 34, routed using best-effort route 40. The QoS Reservation Request 150 includes Flow ID 152, a unique identifier for that reservation, Requested QoS 154, which includes (902) information as to the type of quality of service that the request is seeking, and a value representative of that quality (903), and Route Log 156 which includes data on the route taken. In an embodiment, the types of service quality that may be specified include, but are not limited to: bandwidth, latency, energy consumption per packet, and number of hops. QoS Reservation Request message 150 is then transmitted (904) to destination node D along the default route 40.

Upon receipt of the QoS Reservation Request, NMN 34 calculates (905) a route that best satisfied the QoS requirement for a bi-directional path between WNN 30 and WIG 32. If NMN 34 can find (906) a route that meets Requested QoS 154 then NMN transmits (907) QoS Reservation Response 170 message back to WNN 30. This message includes (908) Flow ID 172 and Time Interval 174 (909), which specifies to WNN 30 how long the bi-directional pathway will be kept open, as well as the nodes that comprise path to be followed in Route Log 176 (910). If NMN 34 is unable to identify a route that meets the requirements of Requested QoS 154 then NMN 34 creates (911) a QoS Reservation Reject packet 190, which contains (912) only Flow ID 192 and Route Log 194, and transmit (913) the QoS Reservation Rejection Packet 190 (FIG. 10) back to WNN 30. WNN 30 will attempt (914) to reestablish the reservation a number of times set by the system administrator during the initial network setup or any time thereafter. If the retries are consumed WNN 30 will then inform (915) its client of the failure to establish a route.

An intervening WNN 30, R, that receives (916) (FIG. 11g) a QoS Reservation Response 170 message to the sending Node S creates (918) two new entries 100 in its Route Table 90, one entry corresponding to sending Node S, and one corresponding to destination Node D. R then, on a system level, provisions (920) bandwidth for the reservation and transmits (922) the QoS Reservation Response 170 to S. Once S receives QoS Route Reservation Response 170 it may begin creating (926) data packets to destined for D, according to whatever conventional communication protocol the network utilizes. Flow_ID 152 is appended (928) to each data packet to identify the relevant route for transmission, and these data packets may be transmitted (930). Once Time Interval 172 has expired (931) the route shuts down (932), and if S needs to communicate further with D a new route must be opened.

Thus, embodiments of the wireless infrastructure access network and method for communication on such network are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of communication, in a wireless infrastructure access network having a plurality of wireless-enabled network nodes (WNNs), with a wireless-enabled infrastructure gateway node (WIG), comprising the steps of:
   establishing a default unidirectional route from each of said plurality of wireless-enabled network nodes (WNNs) to said wireless-enabled infrastructure gateway node (WIG); and
   establishing a bi-directional packet multiple hop pathway that passes through at least one other of said wireless-enabled networks nodes (WNNs) over said wireless infrastructure access network between any given one of said wireless-enabled network nodes (WNNs) and said wireless infrastructure gateway node (WIG) that satisfies a specified quality of service (QoS) using quality of service attributes over an entire length of said multiple hop pathway by:
      transmitting, at periodic intervals, a plurality of status messages from each of said plurality of wireless-enabled network nodes (WNNs) to said wireless-enabled infrastructure gateway node (WIG) with said status message being routed to said wireless-enabled infrastructure gateway node (WIG) over said default unidirectional route from each of said plurality of said wireless-enabled network nodes (WNNs) to said wireless-enabled infrastructure gateway node (WIG);
      processing said plurality of status messages received by said wireless-enabled infrastructure gateway node (WIG) to form a current wireless infrastructure access network picture that depicts prevailing connectivity of said wireless infrastructure access network and available network resources at each of said plurality of wireless-enabled network nodes (WNNs) and quality of service (QoS) between each of said plurality of wireless-enabled network nodes;
      one of said plurality of wireless-enabled network nodes (WNNs) transmitting a provisional request message for a requested route to said wireless-enabled infrastructure gateway node (WIG) indicating a desired quality of service (QoS) along each direction of said requested route;
      relaying said provisional request message to said wireless-enabled infrastructure gateway node (WIG) using said default route from said one of said plurality of wireless-enabled network nodes (WNNs) to said wireless-enabled infrastructure gateway node (WIG),
      relaying said provisional route request message from said wireless-enabled infrastructure gateway node (WIG) to said network manager node;
      processing said provisional route request message to discover from said quality of service (QoS) attributes in said wireless infrastructure access network picture any available bi-directional route between said one of said plurality of wireless-enabled network nodes (WNNs) and said wireless-enabled infrastructure gateway node (WIG) that satisfies said quality of service (QoS) attributes specified in said provisional route request message;
      said network manager node sending a response to said wireless-enabled infrastructure gateway node (WIG) specifying a bi-directional route between said wireless-enabled infrastructure gateway node (WIG) and said one of said plurality of wireless-enabled network nodes (WNNs) if said available bi-directional route is discovered; and
      relaying said response to said one of said plurality of wireless-enabled network nodes (WNNs) over said available bi-directional route between said wireless-enabled infrastructure gateway node (WIG) and said one of said plurality of wireless-enabled network nodes (WNNs) based, at least in part, on said specified quality of service (QoS).

2. A method as in claim 1 wherein said establishing a default unidirectional route step comprises transmitting a plurality of beacon messages from said wireless-enabled infrastructure gateway node (WIG) at periodic intervals to determine said specified quality of service (QoS).

3. A method as in claim 2 wherein each of said plurality of beacon messages comprises a wireless address of said wireless-enabled infrastructure gateway node (WIG) and a unique sequence number generated by said wireless-enabled infrastructure gateway node (WIG).

4. A method as in claim 3 wherein said unique sequence number generated by said wireless-enabled infrastructure gateway node (WIG) monotonically increase for each subsequent one of said plurality of beacon messages.

5. A method as in claim 4 wherein said sequence number is generated from a time source that provides a universal time coordinate (UTC).

6. A method as in claim 5 wherein said sequence number is generated within said wireless-enabled infrastructure gateway node (WIG).

7. A method as in claim 4 wherein no two consecutive ones of said plurality of beacon messages are generated at a same universal time coordinate (UTC).

8. A method as in claim 2 further comprising the steps of:
   maintaining within each one of said plurality of wireless-enabled network nodes (WNNs) said sequence number of a last one of said plurality of beacon messages processed by said one of said plurality wireless-enabled network nodes (WNNs);
   discarding one of said plurality of beacon messages originated by said wireless-enabled infrastructure gateway node (WIG) if said sequence number of said one of said plurality of beacon messages is less than or equal to said sequence number of another of said plurality of beacon messages processed by each one of said plurality of wireless-enabled network nodes (WNNs); and processing each of said plurality of beacon messages originated by said wireless-enabled infrastructure gateway node (WIG) comprising the sub-steps of:
transmitting said one of said plurality of beacon messages to all one-hop neighbors of each of said plurality of wireless-enabled network nodes (WNNs); and
setting a next-hop for said default route to said wireless-enabled infrastructure gateway node (WIG) to be said wireless-enabled network nodes (WNNs) from which said one of said plurality of beacon messages was received based, at least in part, on said specified quality of service (QoS).

9. A method as in claim 8 wherein said processing each of said of plurality of beacon messages is accomplished in each of said plurality of wireless-enabled network nodes (WNNs).

10. A method as in claim 2 further comprising the step of apportioning within each of said plurality of wireless-enabled network nodes (WNNs) a specified amount of network bandwidth for network control traffic transported over said default route to said wireless-enabled infrastructure gateway node (WIG) based, at least in part, on said specified quality of service (QoS).

11. A method as in claim 1 wherein said processing said plurality of status messages is accomplished at a network manager node within said wireless infrastructure access network.

12. A method as in claim 1 wherein each one of said plurality of status messages indicates the presence of one of said plurality of wireless-enabled network nodes (WNNs) originating said one of said plurality of status messages, presence of any one-hop neighbors of said one of said plurality of wireless-enabled network nodes (WNNs) and available network resources at said one of said plurality of wireless-enabled network nodes (WNNs).

13. A method as in claim 12 wherein each one of said plurality of status messages further carries a unique sequence number derived from a monotonically increasing source of sequence numbers.

14. A method as in claim 13 wherein said unique sequence number is derived at said one of said plurality of wireless-enabled network nodes (WNNs).

15. A method as in claim 1 wherein said response to said provisional route request message from one of said plurality of wireless-enabled network nodes (WNNs) originates at said network manager node.

16. A method as in claim 1 wherein said processing said provisional route request message is performed by said network manager node.

17. A method as in claim 1 wherein said response from network manager node is relayed to said one of said plurality of wireless-enabled network nodes (WNNs) by said wireless-enabled infrastructure gateway node (WIG).

18. A method as in claim 1 wherein said provisional route request message from said one of said plurality of wireless-enabled network nodes (WNNs) is associated with a flow identifier and wherein said response to said provisional route request message from said network manager node is also associated with said flow identifier.

19. A method as in claim 18 further comprising the step of processing said response from said network manager node by each of said plurality of wireless-enabled network nodes (WNNs) on said available bi-directional route between said wireless-enabled infrastructure gateway node (WIG) and one of said plurality of wireless-enabled network nodes (WNNs) originating a particular one of said plurality of status messages by updating a routing table at said particular one of said plurality of wireless-enabled network nodes (WNNs) with a next hop entry for said flow identifier in said response.

20. A method as in claim 1 wherein each of said plurality of status messages is indicative at least in part of bandwidth utilization of said wireless infrastructure access network at one of said plurality of wireless-enabled network nodes (WNNs) originating a particular one of said plurality of status messages.

21. A method as in claim 1 wherein each of said plurality of status messages is indicative at least in part of packet queuing latency encountered atone of said plurality of wireless-enabled network nodes (WNNs) originating a particular one of said plurality of status messages.

22. A method as in claim 1 wherein each of said plurality of status messages is indicative at least in part of residual energy at one of said plurality of wireless-enabled network nodes (WNNs) originating a particular one of said plurality of status messages.

23. A method as in claim 1 wherein said quality of service (QoS) attribute comprises a number of hops on said available bi-directional route between one of said plurality of wireless-enabled network nodes (WNNs) and said wireless-enabled infrastructure gateway node (WIG).

24. A method as in claim 1 wherein one of said plurality of wireless-enabled network nodes (WNNs) requesting said available bi-directional route retries said provisional request message if no response is received within a predetermined time interval.

25. A method as in claim 1 wherein said wireless infrastructure access network has a plurality of wireless-enabled infrastructure gateway nodes (WIGs) and wherein one of said plurality of wireless-enabled network nodes (WNNs) requesting said available bi-directional route from one of said plurality of wireless-enabled infrastructure gateway nodes (WIGs) transmits said provisional route request to another one of said plurality of said wireless-enabled infrastructure gateway nodes (WIGs) if one of said plurality of wireless-enabled network nodes (WNNs) does not receive said response after a predetermined number of tries.

26. A method as in claim 1 wherein said quality of service (QoS) attribute comprises bandwidth.

27. A method as in claim 1 wherein said quality of service (QoS) attribute comprises latency.

28. A method as in claim 1 wherein said quality of service (QoS) attribute comprises expended energy.

29. A wireless infrastructure access network, comprising:
a plurality of wireless-enabled network nodes (WNNs), each of said plurality of wireless-enabled network nodes (WNNs) being capable of periodically wirelessly sending a status message indicative of a presence of each respective one of said plurality of wireless-enabled network nodes (WNNs) on said wireless infrastructure access network and any known neighbors of said respective one of said plurality of wireless-enabled network nodes (WNNs);
a network manager node connected to said wireless infrastructure access network that determines a network picture of said wireless infrastructure access network that depicts prevailing network quality of service (QoS) from said status message from each of said plurality of wireless-enabled network nodes (WNNs); and
a wireless-enabled infrastructure gateway node (WIG) having a wireless interface and a network interface for connecting to an internet infrastructure;
each one of said plurality of wireless-enabled network nodes (WNNs) being configured to transmit, at periodic intervals, a plurality status messages from each of said plurality of wireless-enabled network nodes (WNNs) to said wireless-enabled infrastructure gateway node (WIG) with said status message being routed to said wireless-enabled infrastructure gateway node (WIG) over a default unidirectional route from each of said plurality of said wireless-enabled network nodes (WNNs) to said wireless-enabled infrastructure gateway node (WIG), to relay said provisional route request message from said wireless-enabled infrastructure gateway node (WIG) to said network manager node and being configured to wirelessly send a provisional multiple hop provisional route request message to said wireless-enabled infrastructure gateway node (WIG) specifying a desired quality of service (QoS) attribute on each direction of a bi-directional multiple hop route that passes through a plurality of said wireless-enabled network nodes (WNNs) between said one of said plurality of wireless-enabled network nodes (WNNs) and said wireless-enabled infrastructure gateway node (WIG);

said network manager node processing said plurality of status messages received by said wireless-enabled infrastructure gateway node (WIG) to form a current wireless infrastructure access network picture that depicts prevailing connectivity of said wireless infrastructure access network and available network resources at each of said plurality of wireless-enabled network nodes (WNNs) and quality of service (QoS) between each of said plurality of wireless-enabled network nodes and determining said bi-directional multiple hop route from said one of said plurality of wireless-enabled network nodes (WNNs) to said wireless-enabled infrastructure gateway node (WIG) which accommodates said quality of service (QoS) attribute based, at least in part, on said multiple hop provisional route request and said network picture of said wireless infrastructure access network;

said network manager node wirelessly sending a response to said provisional multiple hop route request to said wireless-enabled infrastructure gateway node (WIG) specifying said bi-directional route between said wireless-enabled infrastructure gateway node (WIG) and said one of said plurality of wireless-enabled network nodes (WNNs) if said available bi-directional route is discovered.

said wireless-enabled infrastructure gateway node (WIG) relaying said response to said one of said plurality of wireless-enabled network nodes (WNNs) over said available bi-directional route between said wireless-enabled infrastructure gateway node (WIG) and said one of said plurality of wireless-enabled network nodes (WNNs) based, at least in part, on said specified quality of service (QoS).

30. A wireless infrastructure access network as in claim 29 wherein said network manager node and said wireless-enabled infrastructure gateway node (WIG) are the same.

31. A wireless infrastructure access network as in claim 29 wherein said response is sent using said bi-directional multiple hop route discovered by said network manager node.

32. A wireless infrastructure access network as in claim 31 wherein said response originates with said network manager node.

33. A wireless infrastructure access network as in claim 31 wherein said response is relayed by said wireless-enabled infrastructure gateway node (WIG) to said one of said plurality of wireless-enabled network nodes (WNNs).

34. A wireless infrastructure access network as in claim 29 said provisional route request is associated with a flow identifier and wherein said response is also associated with said flow identifier.

35. A wireless infrastructure access network as in claim 29 wherein said status message indicates bandwidth utilization of wireless network at said one of said plurality of wireless-enabled network nodes (WNNs) originating a particular one of said plurality of status messages.

36. A wireless infrastructure access network as in claim 29 wherein said quality of service (QoS) attribute comprises a number of hops among said plurality of wireless-enabled network nodes (WNNs) on a desired route between said plurality of wireless-enabled network nodes (WNNs) and said wireless-enabled infrastructure gateway node (WIG).

37. A wireless infrastructure access network as in claim 29 wherein said quality of service (QoS) attribute comprises bandwidth.

38. A wireless infrastructure access network as in claim 29 wherein said quality of service (QoS) attribute comprises latency.

39. A wireless infrastructure access network as in claim 29 wherein said quality of service (QoS) attribute comprises expended energy.

* * * * *